US006704213B2

United States Patent
Steimer

(10) Patent No.: US 6,704,213 B2
(45) Date of Patent: Mar. 9, 2004

(54) VOLTAGE CONVERTER SYSTEM HAVING A PLURALITY OF VOLTAGE INVERTERS FOR INCREASING A DC VOLTAGE

(75) Inventor: Peter Steimer, Unterehrendingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 10/005,601

(22) Filed: Dec. 7, 2001

(65) Prior Publication Data

US 2002/0044460 A1 Apr. 18, 2002

(30) Foreign Application Priority Data

Dec. 18, 2000 (EP) ............................. 00811204

(51) Int. Cl.$^7$ ................................. H02M 3/18
(52) U.S. Cl. .......................................... 363/61
(58) Field of Search ............................ 363/16, 59, 60, 363/61, 65, 101, 123, 125

(56) References Cited

U.S. PATENT DOCUMENTS

| 4,462,070 A | | 7/1984 | Iida |
| 5,514,944 A | * | 5/1996 | Miyazaki .................... 318/800 |

FOREIGN PATENT DOCUMENTS

| DE | 19620906 A1 | 1/1998 |
| DE | 19620906 C2 | 1/1998 |
| EP | 0630099 A1 | 12/1994 |

OTHER PUBLICATIONS

"Modular DC–DC converter for high–output voltage applications", S.N. Manias, et al., IEEE Proceedings–B, vol. 140, No. 2, Mar. 1993, pp. 97–102.

"A Switched–Mode Three–Phase Three–Level Telecommunications Rectifier", Roger Gules, et al., Dept. of Electrical Engineering, Power Electronics Institute, Federal University of Santa Catarina, Florianopolis, Brazil, Jun. 6, 1999, pp. 1–7.

"A Novel Three–Level ZVS PWM Inverter Topology for High–Voltage DC/DC conversion Systems with Balanced Voltage Sharing and Wider Load Range", In–Ho Song, et al., Dept. of Electrical Engineering, Hanyang University, Oct. 6, 1996, pp. 973–979.

* cited by examiner

Primary Examiner—Adolf D. Berhane
(74) Attorney, Agent, or Firm—Burns, Doane, Swecker & Mathis, L.L.P.

(57) ABSTRACT

A converter system for increasing a DC voltage is specified, which converter system is formed by at least one converter system element (2) having an input-side DC circuit (3) connected to a first voltage inverter (5), and by a center point connection (4), which is formed by at least two series-connected DC capacitances (21a; 21b). The center point connection (4) is connected to a first connection (22a) of the primary winding (8) of a transformer (7), with the output of the first voltage inverter (5) being connected to a second connection (22b) of the primary winding (8) of the transformer (7), and the secondary winding (9) of the transformer (7) being connected to the input of an output-side converter (6) which is provided for producing an output-side DC voltage. Furthermore, the first voltage inverter (5) is connected by means of a first and a second input connection (23a; 23b) to the DC intermediate circuit (3), and the center point connection (4) is connected via a third input connection (23c) of the first voltage inverter (5) to a center point voltage stage (24) of the first voltage inverter (5), which is in the form of a stepping circuit. Furthermore, a wind power system having a DC transmission system is specified, in which the converter system is advantageously used.

13 Claims, 7 Drawing Sheets

VOLTAGE CONVERTER SYSTEM HAVING A PLURALITY OF VOLTAGE INVERTERS FOR INCREASING A DC VOLTAGE

FIELD OF THE INVENTION

The invention relates to the field of power electronics, and is based on a converter system for increasing a DC voltage, and on a wind power system, as claimed in the precharacterizing clause of the independent claims.

BACKGROUND OF THE INVENTION

A wide range of circuit systems, in particular conventional converter systems, are known for increasing a DC voltage. One suitable converter system, for example, is disclosed in U.S. Pat. No. 4,462,070. The converter system described there is used in particular for coupling two electrical networks. At the input, the converter system according to U.S. Pat. No. 4,462,070 has a DC circuit for this purpose, which is formed by two series-connected DC capacitances, which are interconnected at a center point connection. Furthermore, the DC circuit is connected to a voltage inverter which, as a single-phase bridge circuit, is designed for switching two voltage levels of the DC voltage in the DC circuit, and is used for producing an AC voltage by appropriate control of the switching elements in the voltage inverter. Furthermore, the output of the voltage inverter and the center point connection are each connected to one connection of the primary of a transformer. The secondary of the transformer is connected to a converter, which is used for setting a variable load-dependent direct current for an output circuit which is connected to the output of the converter and is formed by an inductance. The output circuit is coupled directly to the DC circuit, via a common connection of the voltage inverter and of the DC circuit. The converter provides an additional coupling between the output circuit and the DC circuit, and is connected to a further common connection of the voltage inverter and of the DC circuit.

The converter system according to U.S. Pat. No. 4,462,070 allows the already mentioned setting of a variable, load-dependent direct current. However, the cabling complexity is high, and causes additional material costs, due to the various couplings of the DC circuit to the output circuit. Furthermore, although the converter allows a load-dependent direct current to be set, it does not allow a variable, load-independent DC voltage to be set for the output circuit. In addition, the inductance of the output circuit is used as an energy store but, since it is physically large and complex, it causes additional material costs and requires a correspondingly large amount of space. Furthermore, the voltage inverter allows the production of an AC voltage but, since only two voltage levels of the DC voltage in the DC circuit can be switched, it causes considerable harmonics in the AC voltage that is produced, and these are undesirable. Furthermore, the withstand voltage of the switching elements in the voltage inverter restricts the amount of power which can be transmitted from one electrical network to the other, since the switching elements in the voltage inverter must be designed to withstand at least the value of the DC voltage in the DC circuit. Although appropriate switching elements which have a sufficiently high withstand voltage are generally known, such switching elements are expensive, and require complex additional circuitry.

In wind power systems, which are nowadays being increasingly used as alternative energy sources as energy resources disappear, transmission systems, in particular DC transmission systems such as long DC cables, are required for transmitting electrical power. One such wind power system is disclosed in DE 196 20 906 C2. The wind power system in this document has at least one wind power installation, with each wind power installation having a rotor-driven generator, which is connected via a rectifier unit to a DC transmission system. The DC transmission system is connected to a converter network coupling station, which is coupled via a network transformer to a conventional electrical supply network.

In a wind power system according to DE 196 20 906 C2, the DC transmission system is lossy, particularly if high power levels need to be transmitted, resulting from the use of a number of wind power installations. These losses increase drastically if, for example, the DC transmission system has a long DC line, such as those which are normally used for off-shore systems, owing to the long distance between the wind power installations at sea and the coast. At the moment, no suitable wind power system is known for solving these problems.

SUMMARY OF THE INVENTION

One object of the invention is therefore to specify a converter system for increasing a DC voltage, whose design is particularly simple and cost-effective, and which allows a high power level to be transmitted. A further aim is to develop a wind power system such that electrical energy is transmitted at high power levels from wind power installations in the wind power system via a DC transmission system to an electrical supply network with loss levels that are as low as possible and with little circuit complexity. These objects are achieved by the features of Claims 1 and 8. Advantageous developments of the invention are specified in the dependent claims.

The converter system according to the invention has a first voltage inverter, whose first and second input connections are connected to a DC circuit which is formed by at least two series-connected DC capacitances, which are interconnected at a center point connection. According to the invention, the center point connection is connected via a third input connection of the first voltage inverter to a center point voltage stage of the first voltage inverter, which is in the form of a stepping circuit for producing three switching voltage levels. The advantage of the stepping circuit and its connection to the center point connection is that more power can be transmitted than with a single-phase bridge circuit having two possible switching voltage levels, since twice the DC voltage can be used and switched in the DC circuit, with switching elements having the same withstand voltage. Furthermore, an advantageous reduction in harmonics is achieved, since three switching voltage levels can be switched, and it is thus possible to generate a more exact sinusoidal profile for the AC voltage that is to be produced.

In a wind power system having at least one wind power installation, each of which has a rectifier unit, and having a DC transmission system, the rectifier unit according to the invention is connected to the DC transmission system via the converter system for increasing the DC voltage according to the invention. This extremely advantageously means that the DC voltage, in particular the transmission DC voltage in the DC transmission system for transmitting a high power level, can be increased particularly easily and with very little circuit complexity, without having to redesign and use switching elements, particularly in the rectifier unit, for a higher withstand voltage. Furthermore, the increase in the transmission DC voltage advantageously results in the capability to transmit electrical energy from the wind power installation in the wind power system at a high power level, with minimal losses in the DC transmission system, to an electrical supply network.

BRIEF DESCRIPTION OF THE DRAWINGS

These and further objects, advantages and features of the present invention will become evident from the following detailed description of a preferred exemplary embodiment of the invention, in conjunction with the drawings, wherein.

Figure 1:
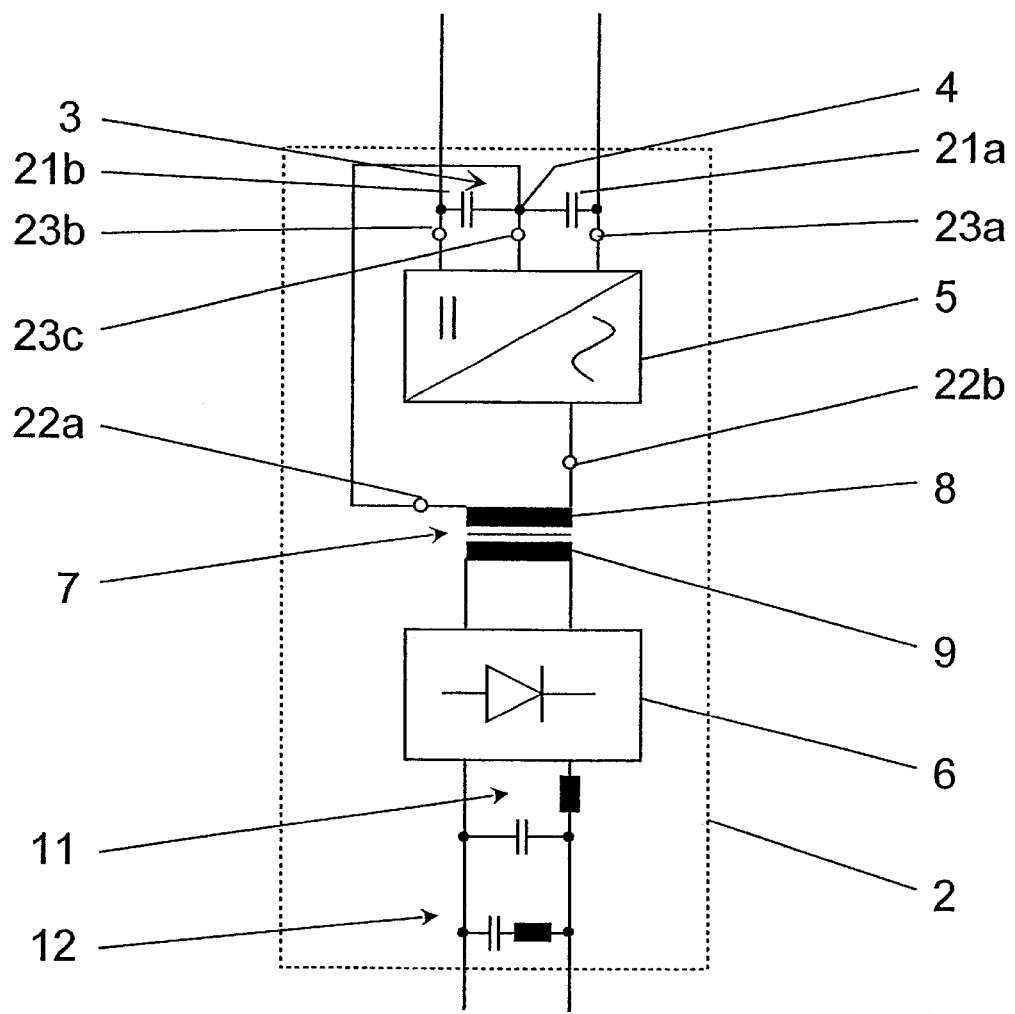
FIG. 1 shows a first embodiment of a converter system according to the invention.

The reference symbols used in the drawing, and their meanings, are listed in summarized form in the list of reference symbols. In principle, identical parts are provided with the same reference symbols in the figures. The described embodiment represents an example of the subject matter of the invention, and has no restrictive effect.

DETAILED DESCRIPTION OF THE INVENTION

FIG. 1 shows one embodiment of a converter system according to the invention for increasing a DC voltage. The converter system shown in FIG. 1 is formed by at least one converter system element 2. Such a converter system element 2 has an input-side DC circuit 3, which is formed by at least two series-connected DC capacitances 21a, 21b, which are used as energy stores. As shown in FIG. 1, two of the DC capacitances 21a, 21b are interconnected to form a center point connection 4. Furthermore, the DC circuit 3 according to the invention is connected to a first and a second input connection 23a, 23b of a first voltage inverter 5, which is used for producing an output-side AC voltage. The center point connection 4 is connected to a first connection 22a of the primary winding 8 of a transformer 7, with the second connection 22b of the primary winding 8 of this transformer 7 being connected to the output of the first voltage inverter 5. As shown in FIG. 1, the secondary winding 9 of the transformer 7 is connected to the input of a converter 6, which is provided for producing an output-side DC voltage.

Figure 4:
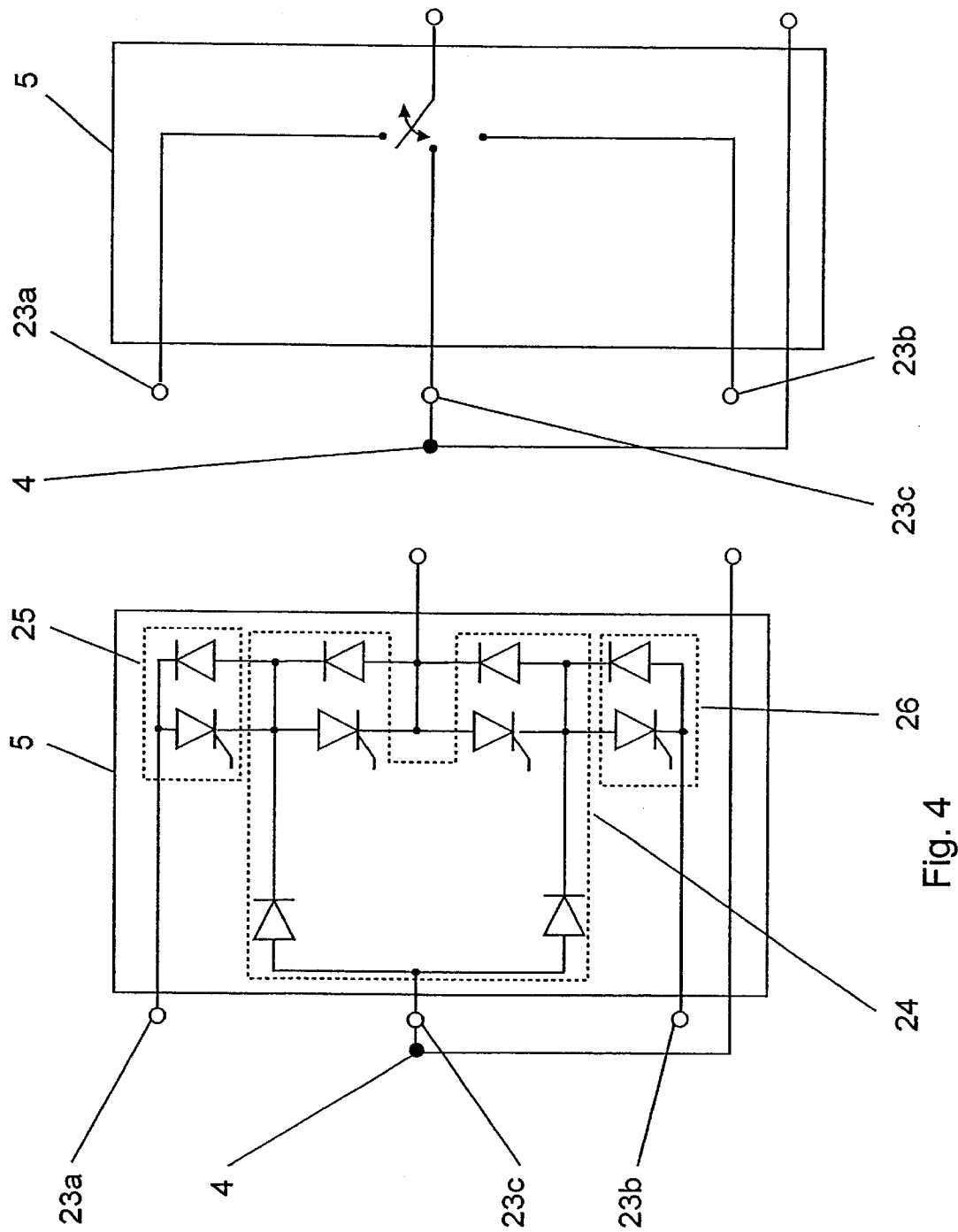
FIG. 4 shows an embodiment of a stepping circuit according to the invention, for producing three voltage switching levels.

According to the invention and as shown in FIG. 1, the center point connection 4 of the DC circuit 3 is connected via a third input connection 23c of the first voltage inverter 5 to a center point voltage stage 24 of the first voltage inverter 5, which is in the form of a stepping circuit for producing three switching voltage levels. FIG. 4 shows one embodiment of the stepping circuit. The stepping circuit in this figure has the already mentioned center point voltage stage 24, which is used for producing a zero switching voltage. Furthermore, the stepping circuit as shown in FIG. 4 has a first switching stage 25, which is provided for producing a positive switching voltage, and a second switching stage 26, which is provided for producing a negative switching voltage. According to the invention, the center point voltage stage 24 as shown in FIG. 4 is connected to the first switching stage 25. Furthermore, the DC circuit 3 is connected to the first switching stage via the first input connection 23a of the inverter 5. In addition, the center point voltage stage 24 is connected to the second switching stage 26, with the DC circuit 3 moreover being connected via the second input connection 23b of the first voltage inverter 5 to the second switching stage 26. The stepping circuit of the first voltage inverter 5 as shown in FIG. 4 makes use of power semiconductor switches, in particular passive switching elements such as diodes and/or active switching elements such as thyristors and/or bipolar transistors with an insulated gate electrode, which are controllable. Furthermore, FIG. 4 shows an outline circuit diagram of the stepping circuit with idealized switches, which correspond to the method of operation of the electrical switching elements.

It has been found to be particularly advantageous to choose the switching frequency of the active switching elements in the first voltage inverter 5 to be in the range between 300 Hz and 2000 Hz, in order to keep the harmonics generated by the switching processes of the active switching elements as small as possible. The advantage of the first voltage inverter 5 being in the form of a stepping circuit is that this allows a higher DC voltage to be switched in the DC circuit 3 in order to produce the output-side AC voltage, thus increasing the amount of power which can be transmitted, in the desired way. The switching elements are advantageously no more severely loaded, and do not need to be designed for any higher withstand voltage than a conventional single-phase bridge circuit with two possible voltage levels. In addition, the stepping circuit as shown in FIG. 4 allows the harmonics to be reduced, since three DC voltage levels can be switched in the DC circuit 3, thus resulting in a more exact sinusoidal profile for the AC voltage that is to be produced.

Furthermore, the converter 6 as shown in FIG. 1, which, as already mentioned, is connected on the input side of the transformer 7, is in the form of a voltage rectifier for producing an output-side DC voltage by which means a DC voltage can be produced at the output of the converter by means of the transformer 7 that is connected to it, and this DC voltage can be advantageously varied independently of the load and, in particular, can be increased to the desired extent independently of the load from the DC voltage in the DC circuit. The transformation ratio between the primary 8 and the secondary 9 of the transformer 7 is preferably chosen to be in the range between 1:5 and 1:50, so that the AC voltage on the secondary 9 is increased in comparison to the AC voltage on the primary as a result of which the desired increased DC voltage is then generated at the output, by means of the converter 6 described above. The transformer 7 also provides DC isolation between the DC circuit 3 and the output of the converter 6, thus making it possible to save cable material, since no further connections are provided between the DC circuit 3 and the output of the converter 6.

Figure 2:
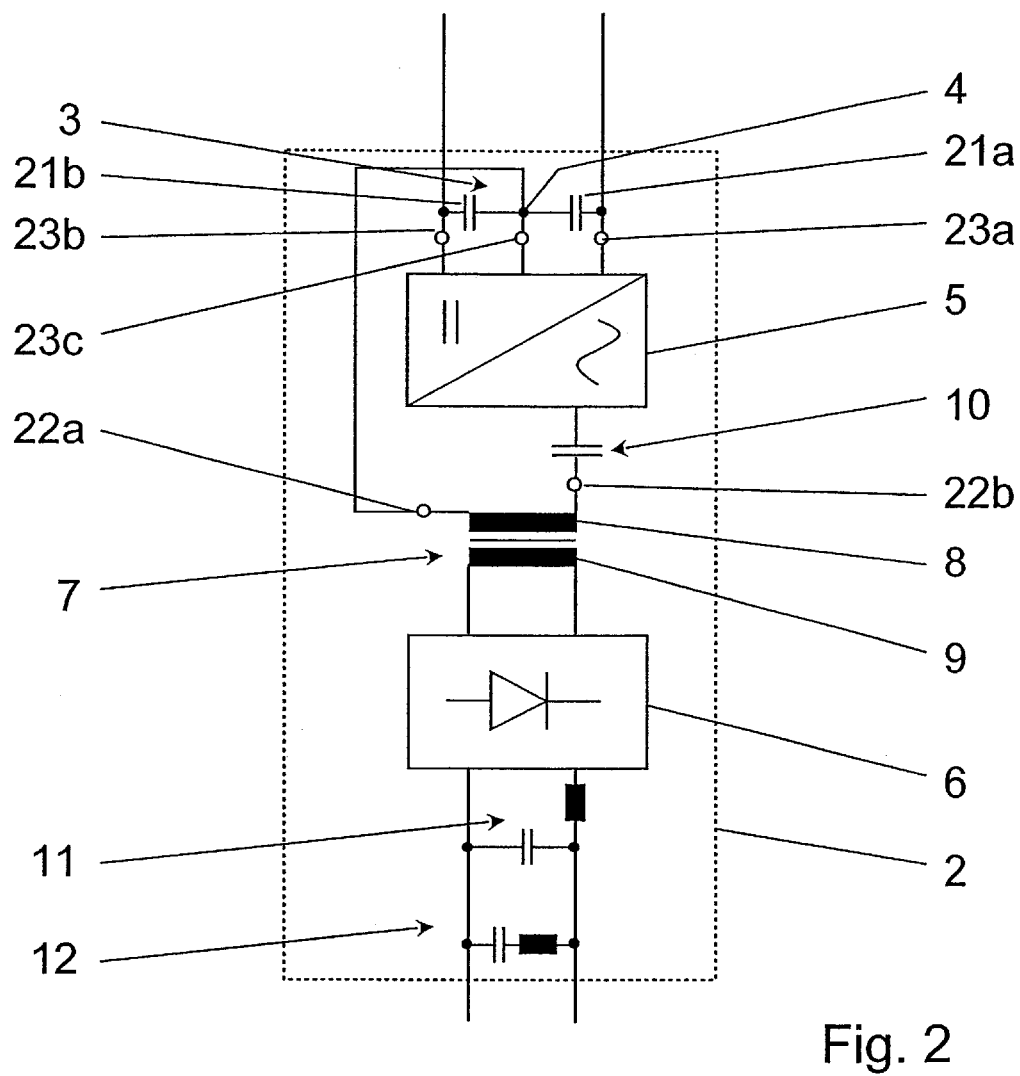
FIG. 2 shows a second embodiment of a converter system according to the invention.

FIG. 2 shows a second embodiment of a converter system according to the invention, with this embodiment differing from the first embodiment, described above, of the converter system as shown in FIG. 1 in that the first voltage inverter 5 in the converter system element 2 according to the invention is connected via a resonant capacitance 10 to the second connection 22b of the primary winding 8 of the transformer 7. This resonant capacitance 10 is advantageously used to form a resonant tuned circuit, thus allowing soft switching of the power semiconductor switches in the first voltage inverter 5, in particular at zero voltage or zero current.

As shown in FIG. 1 and FIG. 2, the output of the converter 6 in the converter system element 2 of the converter system is, according to the invention, connected to a DC filter circuit 11 for smoothing the output-side DC voltage. The DC filter circuit 11 preferably has a DC filter inductance and a DC filter capacitance for this purpose. Furthermore, as shown in FIG. 1 and FIG. 2, a harmonic filter circuit 12 is provided, which is connected in parallel with the DC filter circuit 11 and has a series tuned circuit. The series tuned circuit is tuned to a harmonic frequency, in particular to the second harmonic frequency of the fundamental of the AC voltage at the output of the first voltage inverter 5, and is used for filtering this harmonic in the DC voltage at the output of the converter 6.

Figure 3A:
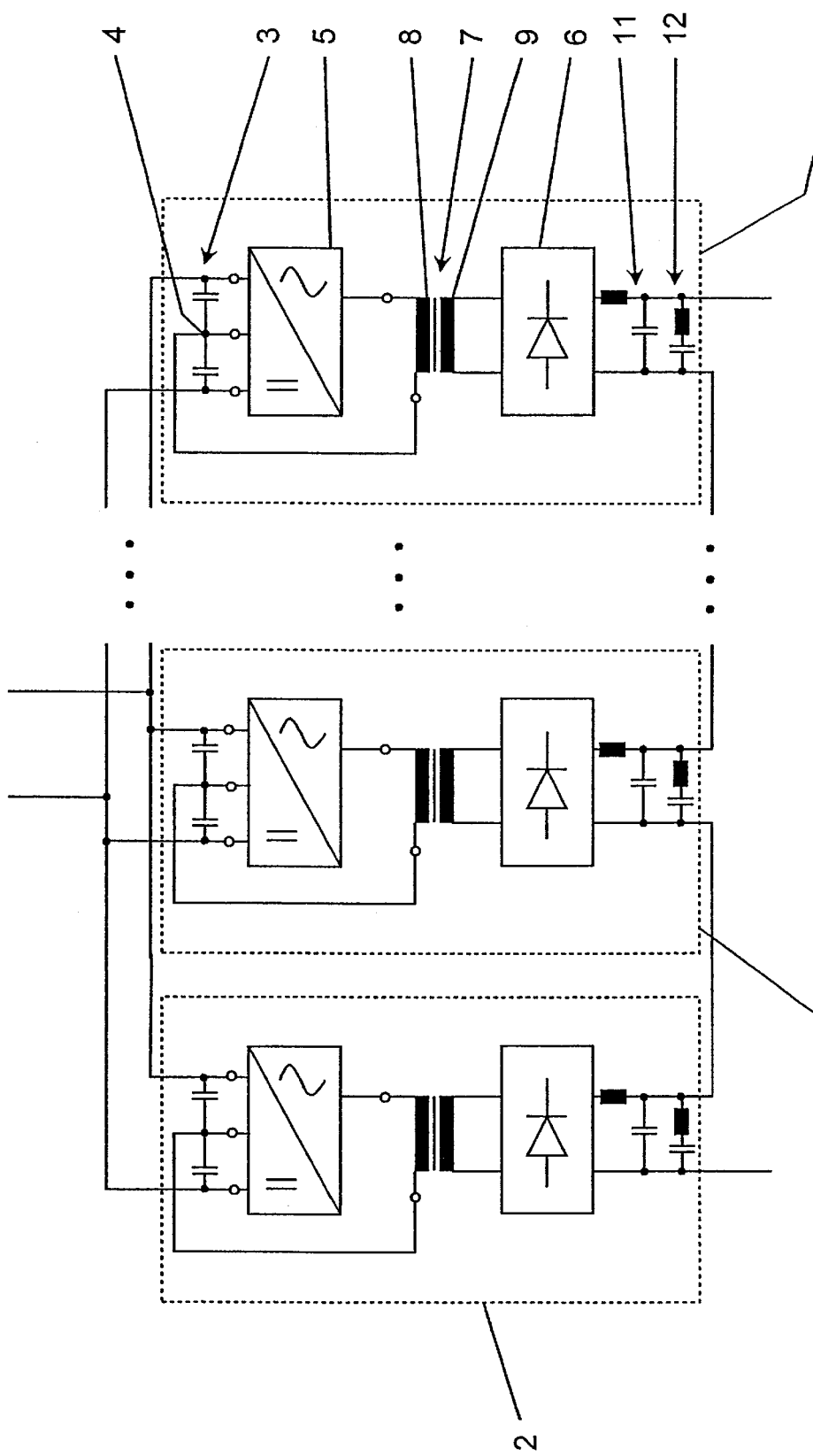
FIG. 3a shows a third embodiment of a converter system according to the invention.

As described above, the converter system allows a high power level to be transmitted by virtue of its simple and cost-effective design and by efficiently increasing the DC voltage. According to a third embodiment of the converter system according to the invention, as illustrated in FIG. 3a, the converter system is formed by a number of converter system elements 2, which advantageously means that even higher power levels can be transmitted. As shown in FIG. 3a, in the situation where the converter system is formed by a number of converter system elements 2, the converter system elements 2 are connected in series on the output side and in parallel on the input side. The fact that the converter system elements 2 are connected in series on the output side means that the individual DC voltage components are added together at the outputs of the converter system elements 2 to form an overall DC voltage, which can then be used for transmitting a desired high power level. The number of converter system elements 2 in the converter system can very easily be varied for matching to a required high power level.

Figure 3B:
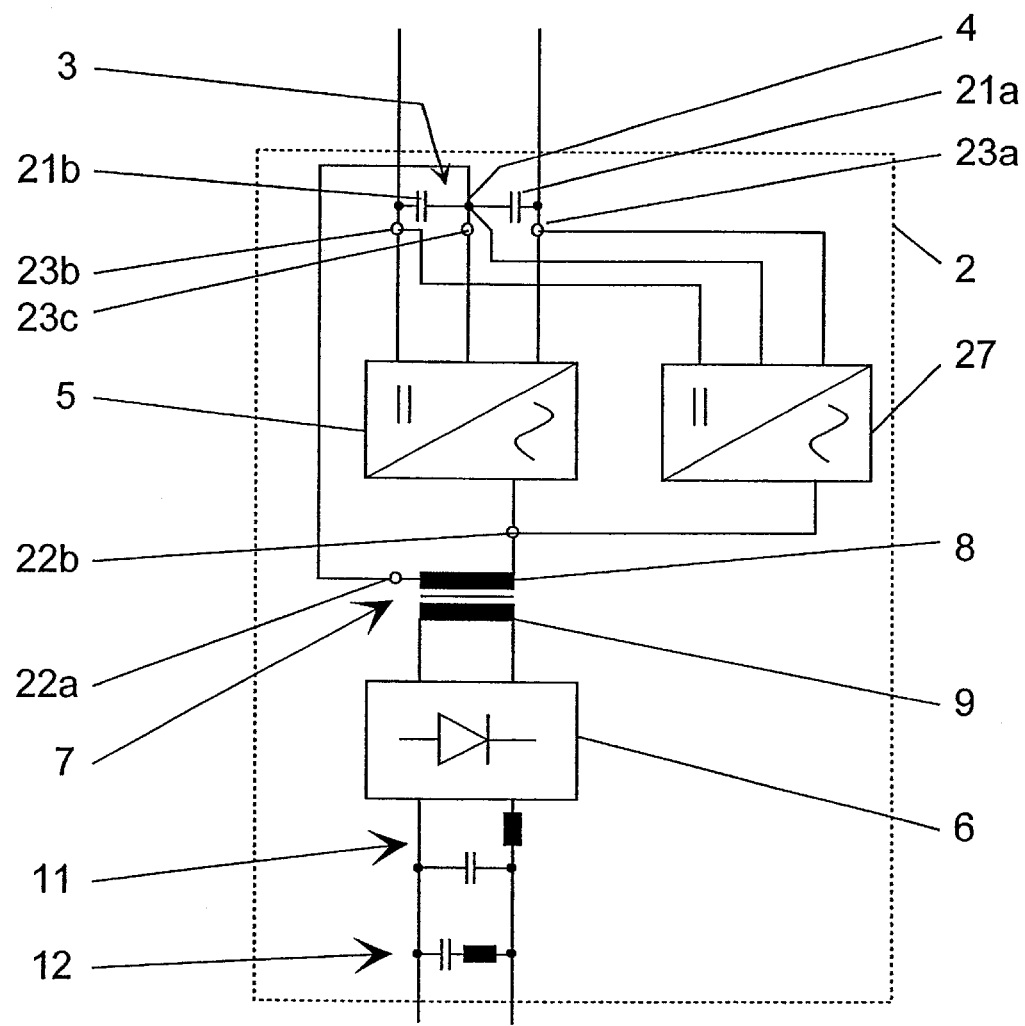
FIG. 3b shows a fourth embodiment of a converter system according to the invention.

In a fourth embodiment of the converter system according to the invention shown in FIG. 3b, a second voltage inverter 27 is provided, which is connected on the input side to the first and second input connection 23a, 23b of the first voltage inverter 5. Furthermore, the second voltage inverter 27 is connected on the input side to the center point connection 4. On the output side, the second voltage inverter 27 is connected to the second connection 22b of the primary winding 8 of the transformer 7, so that the second voltage inverter 27 is connected in parallel with the first voltage inverter 5. This parallel connection splits the power flow on the input side of the converter system between the two voltage inverters 5, 27, so that each individual voltage inverter 5, 27, and in particular their switching elements, is less severely loaded. The second voltage inverter 27 is likewise in the form of a stepping circuit (in the same way as the first voltage inverter 5) for producing three switching voltage levels and is thus designed as described above and as shown in FIG. 4. It has also been found to be advantageous for the second voltage inverter 27 for the switching frequency of the active switching elements in the second voltage inverter 27 to be chosen to be in the range between 300 Hz and 2000 Hz, in order to keep the harmonics generated by the switching processes of the active switching elements as small as possible.

Figure 3C:
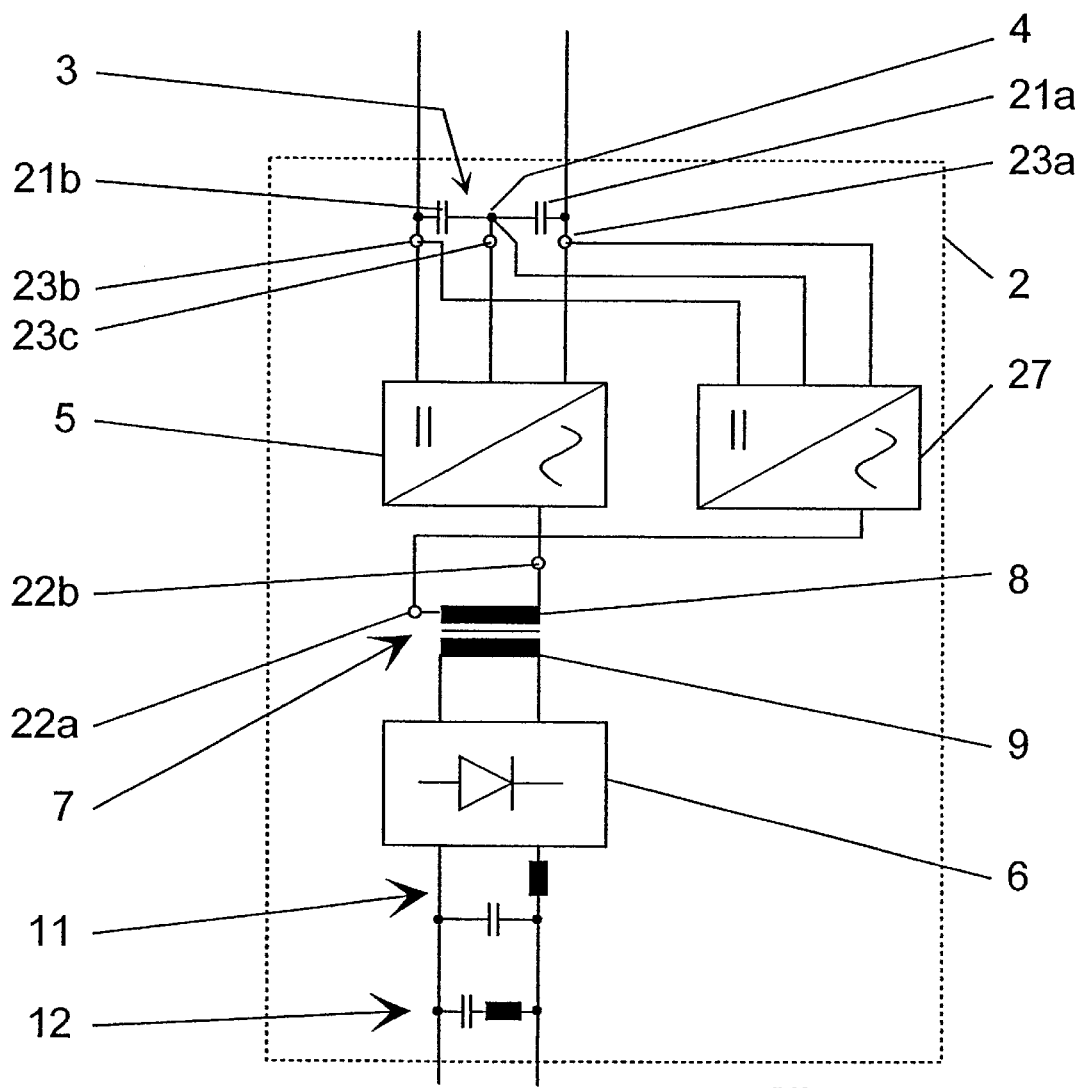
FIG. 3c shows a fifth embodiment of a converter system according to the invention.

In a fifth embodiment of the converter system according to the invention shown in FIG. 3c, a second voltage inverter 27 is provided, which is connected on the input side to the first and second input connection 23a, 23b of the first voltage inverter 5. Furthermore, the second voltage inverter 27 is connected on the input side to the center point connection 4. On the output side, instead of the center point connection 4 the second voltage inverter 27 is connected to the first connection 22a of the primary winding 8 of the transformer 7, so that the second voltage inverter 27 is connected in parallel with the first voltage inverter 5. This parallel connection splits the power flow on the input side of the converter system between the two voltage inverters 5, 27, so that each individual voltage inverter 5, 27, and in particular their switching elements, is less severely loaded. The second voltage inverter 27 is likewise in the form of a stepping circuit (in the same way as the first voltage inverter 5) for producing three switching voltage levels and is thus designed as described above and as shown in FIG. 4.

Figure 5:
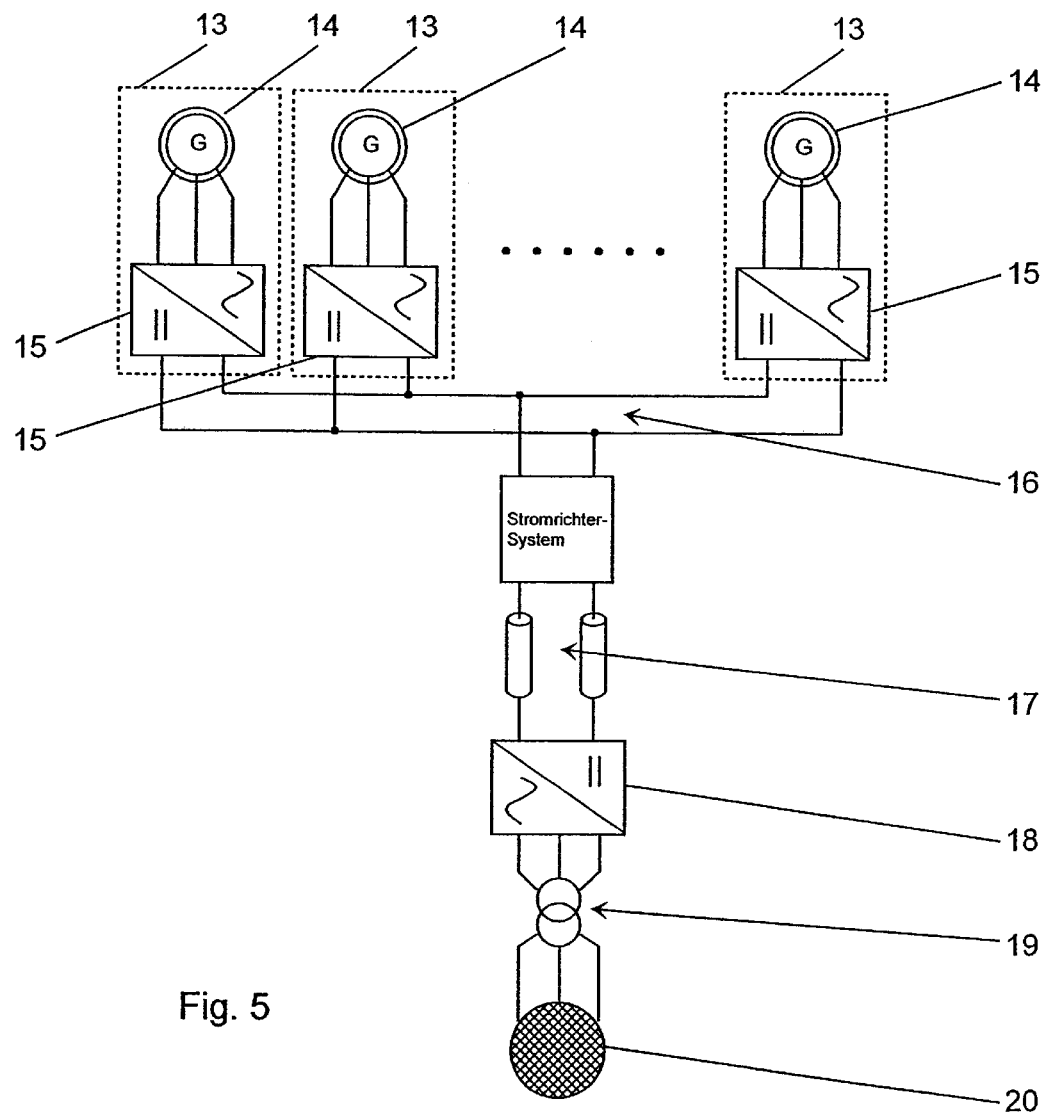
FIG. 5 shows an embodiment of a wind power system according to the invention.

FIG. 5 shows an embodiment of a wind power system according to the invention, in particular with a DC transmission system 17. The wind power system shown in FIG. 5 has at least one wind power installation 13, each of which has a rotor-driven generator 14, which is not shown in FIG. 5, for the sake of clarity, but which is connected via a rectifier unit 15 to the DC transmission system 17. As shown in FIG. 5, the DC transmission system 17 is connected to a converter network coupling station 18, which is used for coupling to a conventional electrical supply network 20 via a network transformer 19.

In order to reduce the losses in the DC transmission system 17 in the wind power system, the rectifier unit 15 is connected to the DC transmission system 17 via a converter system according to the invention for increasing the DC voltage, in particular the DC transmission voltage in the DC transmission system 17. This increase in the DC transmission voltage has a particularly advantageous effect in DC transmission systems with long transmission paths, such as those which often occur in off-shore applications of wind power systems. Firstly, this is because losses, in particular heat losses which are caused by a large current when it is necessary to transmit a high power level and the DC transmission voltage is too low, are minimized if the DC transmission voltage is increased. Secondly, this is done to save material, for example cable material, which is required if the DC transmission voltage is too low and the power level to be transmitted is at the same time high, in order to make it possible to cope with the correspondingly high current.

As shown in FIG. 5, a number of wind power installations 13 are used for relatively high power levels, with the rectifier units 15 being connected in parallel according to the invention, via a DC busbar system 16, in order advantageously to achieve a redundant supply for the rectifier units 15.

In the wind power system according to the invention as shown in FIG. 5, it has furthermore been found to be advantageous for the converter 6 in the converter system to preferably have active switching elements and/or passive switching elements, in which case the DC transmission voltage magnitude can advantageously be varied, with suitable control, by means of active switching elements, in particular by means of controllable semiconductor switches.

In wind power systems which are subject to extreme influences such as temperature fluctuations and/or climatic and environmental influences, the inverter 6 preferably has passive switching elements, in particular diodes. The use of these passive switching elements means, for example, that there is no need for control circuits for the switching elements and, in particular, this considerably reduces the maintenance effort and the possible failure rate, for example in off-shore applications of wind power systems which are maintained only at certain times of the year owing to the weather conditions that occur at sea. Furthermore, the increase in the DC transmission voltage is achieved very easily and with little circuit complexity, since there is no possibility of any interaction between the rectifier unit 15 and the increase in the DC transmission voltage, thus avoiding considerable cost, insulation complexity and circuit complexity resulting from redesign and replacement of electronic power switching elements in the rectifier unit 15.

It is self-evident that a person skilled in the art may use blocks, units and signals other than those cited in the exemplary embodiment with the same effect.

List of Reference Symbols

2 Converter system element
3 DC Circuit
4 Centre point connection
5 First voltage inverter
6 Converter
7 Transformer
8 Primary
9 Secondary
10 Resonant capacitance
11 DC filter circuit
12 Harmonic filter circuit
13 Wind power installation
14 Generator
15 Rectifier unit
16 DC busbar system
17 DC transmission system
18 Converter network coupling station
19 Network transformer
20 Electrical supply network
21a, 21b DC capacitance
22a First connection of the primary of the transformer
22b Second connection of the primary of the transformer
23a First input connection of the first voltage inverter
23b Second input connection of the first voltage inverter
23c Third input connection of the first voltage inverter
24 Center point voltage stage
25 First switching stage
26 Second switching stage
27 Second voltage inverter

What is claimed is:

1. A converter system for increasing a DC voltage, formed by at least one converter system element having an input-side DC circuit connected to a first voltage inverter, and by a center point connection, which is formed by at least two series-connected DC capacitances in the DC intermediate circuit, wherein a second connection of a primary winding of a transformer is connected to the output of the first voltage inverter, with the secondary winding of the transformer being connected to the input of an output-side converter which is provided for producing an output-side DC voltage, wherein the first voltage inverter is connected by means of a first and a second input connection to the DC intermediate circuit, and wherein the center point connection is connected via a third input connection of the first voltage inverter to a center point voltage stage of the first voltage inverter, which is in the form of a stepping circuit for producing three switching voltage levels, wherein a second voltage inverter is provided, which is connected on the input side to the first and second input connections of the first voltage inverter and to the center point connection, and wherein the second voltage inverter is connected on the output side to a first connection of the primary winding of the transformer.

2. The converter system as claimed in claim 1, wherein the center point voltage stage is connected to a first switching stage, which is provided for producing a positive switching voltage level, of the stepping circuit, and wherein the DC intermediate circuit is connected via the first input connection of the first voltage inverter to the first switching stage.

3. The converter system as claimed in claim 1, wherein the center point voltage stage is connected to a second switching stage, which is provided for producing a negative switching voltage level, of the stepping circuit, and wherein the DC intermediate circuit is connected via the second input connection of the first voltage inverter to the second switching stage.

4. The converter system as claimed in claim 1, wherein the switching frequency of the active switching elements in the first voltage inverter is chosen to be in the range between 300 Hz and 3000 Hz.

5. The converter system as claimed in claim 1, wherein the switching frequency of the active switching elements in the second voltage inverter is chosen to be in the range between 300 Hz and 3000 Hz.

6. The converter system as claimed in claim 1, wherein the transformation ratio between the primary and the secondary of the transformer is chosen to be in the range between 1:5 and 1:50.

7. The converter system as claimed in claim 1, wherein the first voltage inverter is connected via a resonant capacitance to the second connection of the primary winding of the transformer.

8. The converter system as claimed in claim 1, wherein the output of the converter is connected to a DC filter circuit, which has a DC filter inductance and a DC filter capacitance.

9. The converter system as claimed in claim 7, wherein a harmonic filter circuit is provided, is connected in parallel with the DC filter circuit and has a series tuned circuit which is tuned to a harmonic frequency.

10. The converter system as claimed in claim 1, wherein the converter system elements are connected in series on the output side, and wherein the converter system elements are connected in parallel on the input side.

11. A wind power system having at least one wind power installation, each of which has a generator which is driven by a rotor and is connected via a rectifier unit to a DC transmission system which is connected to a converter network coupling station, which is coupled via a network transformer to an electrical supply network, wherein the rectifier unit is connected to the DC transmission system via a converter system which is provided for increasing a DC voltage, in particular as claimed in claim 1.

12. The wind power system as claimed in claim 11, wherein the converter units of a number of wind power installations are connected in parallel via a DC busbar system.

13. The wind power system as claimed in claim 11, wherein the converter of the converter system has passive switching elements, in particular diodes, and/or active switching elements, in particular controllable semiconductor switches.

* * * * *